(12) United States Patent
Chang et al.

(10) Patent No.: US 12,437,414 B2
(45) Date of Patent: Oct. 7, 2025

(54) IMAGE PROCESSING METHOD, ELECTRONIC DEVICE, AND NON-TRANSITORY COMPUTER-READABLE STORAGE MEDIUM

(71) Applicant: Beijing Baidu Netcom Science and Technology Co., Ltd., Beijing (CN)

(72) Inventors: Yanlong Chang, Beijing (CN); Huaifei Xing, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 353 days.

(21) Appl. No.: 18/110,231

(22) Filed: Feb. 15, 2023

(65) Prior Publication Data

US 2023/0260131 A1    Aug. 17, 2023

(30) Foreign Application Priority Data

Feb. 17, 2022    (CN) .......................... 202210147255.5

(51) Int. Cl.
*G06K 9/00*    (2022.01)
*G06F 3/14*    (2006.01)
(Continued)

(52) U.S. Cl.
CPC ................. *G06T 7/12* (2017.01); *G06F 3/14* (2013.01); *G06T 7/0002* (2013.01); *G06T 7/13* (2017.01);
(Continued)

(58) Field of Classification Search
None
See application file for complete search history.

(56) References Cited

U.S. PATENT DOCUMENTS

2018/0285481 A1*  10/2018  Czmyrid ................. G06F 30/13

FOREIGN PATENT DOCUMENTS

CN        103312930 A       9/2013
CN        110324464 A      10/2019
(Continued)

OTHER PUBLICATIONS

Internet document Gigazine ""Compressor" which compresses and reduces JPG, PNG, GIF, SVG images free of charge", (extracted from: https://gigazine.net/gsc_news/en/20140527-compressor), published May 27, 2014 (Year: 2014).*

(Continued)

*Primary Examiner* — SJ Park
(74) *Attorney, Agent, or Firm* — Leydig, Voit & Mayer, Ltd.

(57) ABSTRACT

Provided are an image processing method, an electronic device, and a non-transitory computer-readable storage medium. The implementation includes that: a segmentation position of a segmentation line in a display region is determined, a first partial image extracted from a first to-be-displayed image is displayed on a first side of the segmentation line according to the segmentation position, and a second partial image extracted from a second to-be-displayed image is displayed on a second side of the segmentation line according to the segmentation position, where the encoding manner of the first to-be-displayed image is different from that of the second to-be-displayed image; and the content of a synthesized image synthesized by the first partial image and the second partial image is the same as the image content of the first to-be-displayed image and the content of the synthesized image is the same as the image content of the second to-be-displayed image.

12 Claims, 5 Drawing Sheets

(51) Int. Cl.
  *G06T 7/00*    (2017.01)
  *G06T 7/12*    (2017.01)
  *G06T 7/13*    (2017.01)
  *G06V 10/25*   (2022.01)
  *G06V 10/74*   (2022.01)

(52) U.S. Cl.
  CPC ............ *G06V 10/25* (2022.01); *G06V 10/761* (2022.01); *G06T 2207/30168* (2013.01)

(56) References Cited

FOREIGN PATENT DOCUMENTS

| | | |
|---|---|---|
| CN | 111223105 A | 6/2020 |
| CN | 111753202 A | 10/2020 |
| CN | 111767455 A | 10/2020 |
| CN | 112231563 A | 1/2021 |
| CN | 112337091 A | 2/2021 |
| CN | 112889027 A | 6/2021 |
| CN | 113362227 A | 9/2021 |
| CN | 113747135 A | 12/2021 |
| WO | WO 2020/233517 A | 11/2020 |

OTHER PUBLICATIONS

Internet document Nicole "ShortPixel review: pros & cons of an image optimization & compression WordPress plugin", (extracted from: https://www.nicolecw.com/entrepreneurship/shortpixel-review/ ), published May 15, 2020 (Year: 2020).*

Henan Center for Patent Examination Collaboration, Chinese Supplemental Search Report in corresponding Chinese Application No. 2022101472555 dated Aug. 23, 2023.

Zhiwei Tang et al., "One Image Segmentation Method Based on Otsu and Fuzzy Theory Seeking Image Segment Threshold," IEEE, 978-1-4577-0321, pp. 2170-2173 (2011).

* cited by examiner

IMAGE PROCESSING METHOD, ELECTRONIC DEVICE, AND NON-TRANSITORY COMPUTER-READABLE STORAGE MEDIUM

CROSS-REFERENCE TO RELATED APPLICATION

This application claims priority to Chinese Patent Application No. 202210147255.5 filed Feb. 17, 2022, the disclosure of which is incorporated herein by reference in its entirety.

TECHNICAL FIELD

The present disclosure relates to the field of image processing technology and, in particular, to computer vision technology. The present disclosure can be used in a scenario of subjectively evaluating image display resolution and specifically relates to an image processing method, an electronic device, and a non-transitory computer-readable storage medium.

BACKGROUND

With the rapid development and wide application of computer technology, image processing technology has also developed rapidly. In the process of image processing, it is necessary to compare the qualities of different images. How to perform an image comparison has become an important issue in the industry.

SUMMARY

The present disclosure provides an image processing method, an electronic device, and a non-transitory computer-readable storage medium.

According to an aspect of the present disclosure, an image processing method is provided. The method includes the steps below.

A segmentation position of a segmentation line in a display region is determined.

A first partial image extracted from a first to-be-displayed image is displayed on a first side of the segmentation line according to the segmentation position, and a second partial image extracted from a second to-be-displayed image is displayed on a second side of the segmentation line according to the segmentation position.

The encoding manner of the first to-be-displayed image is different from the encoding manner of the second to-be-displayed image. Content of a synthesized image synthesized by the first partial image and the second partial image is the same as image content of the first to-be-displayed image and the content of the synthesized image is the same as image content of the second to-be-displayed image.

According to another aspect of the present disclosure, an electronic device is provided. The electronic device includes at least one processor and a memory communicatively connected to the at least one processor.

The memory stores an instruction executable by the at least one processor. The instruction is executed by the at least one processor to cause the at least one processor to perform: determining a segmentation position of a segmentation line in a display region; and displaying, according to the segmentation position, a first partial image extracted from a first to-be-displayed image on a first side of the segmentation line, and displaying, according to the segmen- tation position, a second partial image extracted from a second to-be-displayed image on a second side of the segmentation line; wherein an encoding manner of the first to-be-displayed image is different from an encoding manner of the second to-be-displayed image; and content of a synthesized image synthesized by the first partial image and the second partial image is the same as image content of the first to-be-displayed image and the content of the synthesized image is the same as image content of the second to-be-displayed image.

According to another aspect of the present disclosure, a non-transitory computer-readable storage medium is provided. The storage medium stores a computer instruction configured to cause a computer to perform: determining a segmentation position of a segmentation line in a display region; and displaying, according to the segmentation position, a first partial image extracted from a first to-be-displayed image on a first side of the segmentation line, and displaying, according to the segmentation position, a second partial image extracted from a second to-be-displayed image on a second side of the segmentation line; wherein an encoding manner of the first to-be-displayed image is different from an encoding manner of the second to-be-displayed image; and content of a synthesized image synthesized by the first partial image and the second partial image is the same as image content of the first to-be-displayed image and the content of the synthesized image is the same as image content of the second to-be-displayed image.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, a description of well-known functions and constructions is omitted hereinafter for clarity and conciseness.

Figure 1:
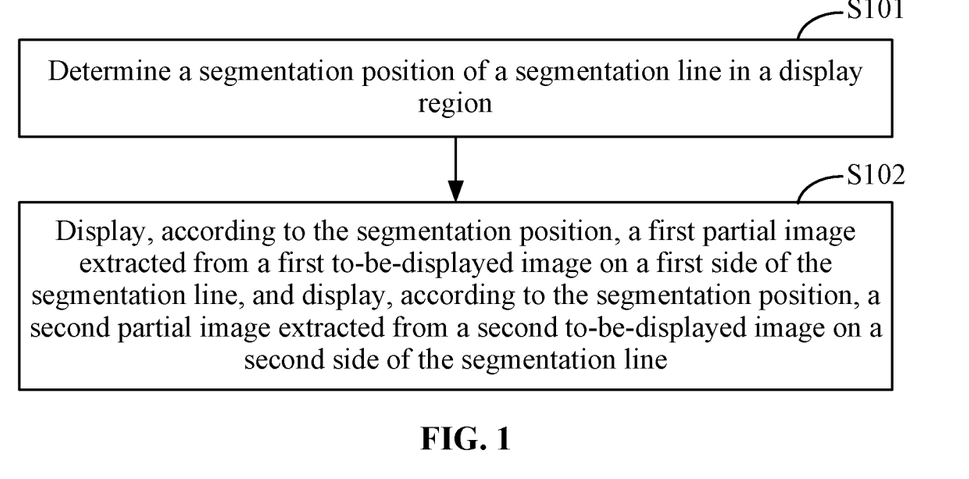
FIG. 1 is a diagram of an image processing method according to an embodiment of the present disclosure.

FIG. 1 is a diagram of an image processing method according to an embodiment of the present disclosure. This embodiment is applicable to the case of displaying different images. The method is executable by an image processing apparatus. The apparatus may be implemented in hardware and/or software and may be integrated in an electronic device with the function of processing. That is, the method is performed by an image processing client. As shown in FIG. 1, the method includes the steps below.

In S101, a segmentation position of a segmentation line in a display region is determined.

In S102, a first partial image extracted from a first to-be-displayed image is displayed on a first side of the segmentation line according to the segmentation position, and a second partial image extracted from a second to-be-displayed image is displayed on a second side of the segmentation line according to the segmentation position.

The encoding manner of the first to-be-displayed image is different from the encoding manner of the second to-be-displayed image. The content of a synthesized image synthesized by the first partial image and the second partial image is the same as both the image content of the first to-be-displayed image and the image content of the second to-be-displayed image.

In embodiments of the present disclosure, the image content of the first to-be-displayed image is the same as the image content of the second to-be-displayed image, but the encoding manner of the first to-be-displayed image is different from the encoding manner of the second to-be-displayed image. The first to-be-displayed image and the second to-be-displayed image are images on which a quality comparison needs to be performed. The result of the quality comparison between the first to-be-displayed image and the second to-be-displayed image can provide a basis for the selection of an encoding manner.

The display region of the image processing client may include the segmentation line. The segmentation line is used for segmenting the display region into two parts. The segmentation position is used for representing the position information of the segmentation line in the display region. The segmentation line may be a segment parallel to the bottom of the display region. In this case, the segmentation position is the ordinate of the segmentation line. Alternatively, the segmentation line may be a segment perpendicular to the bottom of the display region. In this case, the segmentation position is the abscissa of the segmentation line. The segmentation line is movable and may be moved according to user requirements. In an example in which the display region is rectangular and the segmentation line is perpendicular to the bottom of the display region, the abscissa of the segmentation line may serve as the segmentation position of the segmentation line. The first side of the segmentation line and the second side of the segmentation line are used for representing different display sub-regions obtained by the segmentation of the segmentation line and can be set according to a habit. Exemplarily, in an example in which the segmentation line is perpendicular to the bottom of the display region, the left side of the segmentation line may be set as the first side and the right side of the segmentation line may be set as the second side respectively. It is to be noted that the "first" and the "second" are only used for distinguishing names and have no indication in sequence or superiority. Moreover, embodiments of the present disclosure do not limit the manner of displaying the segmentation line. The segmentation line may be solid or dashed. The transparency of the segmentation line may be adjusted. A hidden segmentation line is also supported.

The first to-be-displayed image and the second to-be-displayed image may be images or videos. In an embodiment, the first partial image may be extracted from the first to-be-displayed image according to the segmentation position, and the second partial image may be extracted from the second to-be-displayed image according to the segmentation position. Moreover, the first partial image is displayed in a first display sub-region on the first side of the display region, and the second partial image is displayed in a second display sub-region on the second side of the display region.

Figure 2:
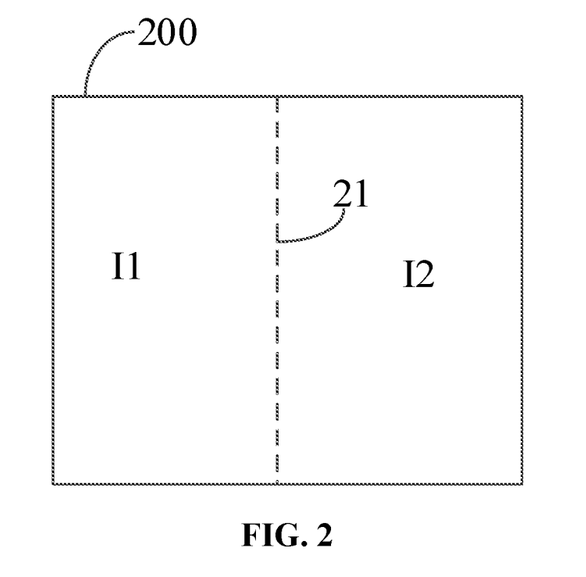
FIG. 2 is a diagram of a display region according to an embodiment of the present disclosure.

FIG. 2 is a diagram of a display region according to an embodiment of the present disclosure. Referring to FIG. 2, a display region 200 of an image processing client is segmented by a segmentation line 21. The partial content of a first to-be-displayed image I1 and the partial content of a second to-be-displayed image 12 are displayed synchronously so that the two to-be-displayed images can be displayed partially on two sides of the display region 200 simultaneously in the process of an image quality comparison, improving the convenience of the image quality comparison and enabling a user to visually view the partial image content of the two to-be-displayed images through the display region 200 and determine the result of the subjective quality comparison. Moreover, the segmentation line 21 is movable. That is, the display ratio of the first to-be-displayed image I1 to the second to-be-displayed image 12 may be adjusted flexibly, further improving the flexibility of the image quality comparison.

Figure 3:
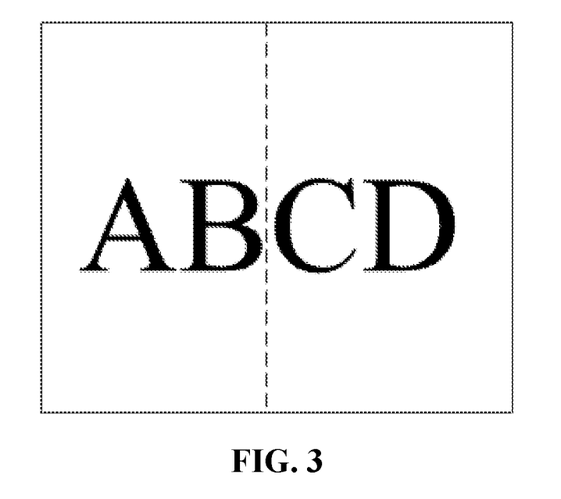
FIG. 3 is a diagram of the content of a synthesized image according to an embodiment of the present disclosure.

FIG. 3 is a diagram of the content of a synthesized image according to an embodiment of the present disclosure. Referring to FIG. 3, an example is taken in which the content of the synthesized image includes four characters ABCD. That is, in the example, the content of the first to-be-displayed image and the content of the second to-be-displayed image both include the four characters ABCD. The first partial image extracted from the content of the first to-be-displayed image may include two characters AB, the second partial image extracted from the content of the second to-be-displayed image may include two characters CD, and the content of the synthesized image synthesized by the first partial image and the second partial image also includes the four characters ABCD. Additionally, it is to be noted that embodiments of the present disclosure do not limit the display ratio of the first partial image to the display region and the display ratio of the second partial image to the display region because the segmentation line is movable. For example, the content of the first partial image may only include a letter A, and the content of the second partial image may include letters BCD.

The two to-be-displayed images with the same image content but different encoding manners are displayed partially on two sides of the display region. Moreover, the content of the synthesized image displayed in the display region is the same as the content of each of the two to-be-displayed images. In this case, the convenience and flexibility of the image quality comparison can be improved, and the integrity of the content of the synthesized image in the display region is maintained, thereby improving the user experience.

In the technical scheme of this embodiment, the display region is segmented into two display sub-regions through the segmentation line, which facilitates operation. Additionally, the first partial image is displayed on the first side of the segmentation line, the second partial image is displayed on the second side of the segmentation line, and the two to-be-displayed images with the same image content but different encoding manners are displayed partially on two sides of the display region. In this case, the convenience and flexibility of the image quality comparison can be improved. Moreover, the content of the synthesized image is the same as the content of each of the two to-be-displayed images, maintaining the integrity of the content of the synthesized image in the display region, improving the convenience and flexibility of the image quality comparison, and thereby improving the user experience.

Figure 4:
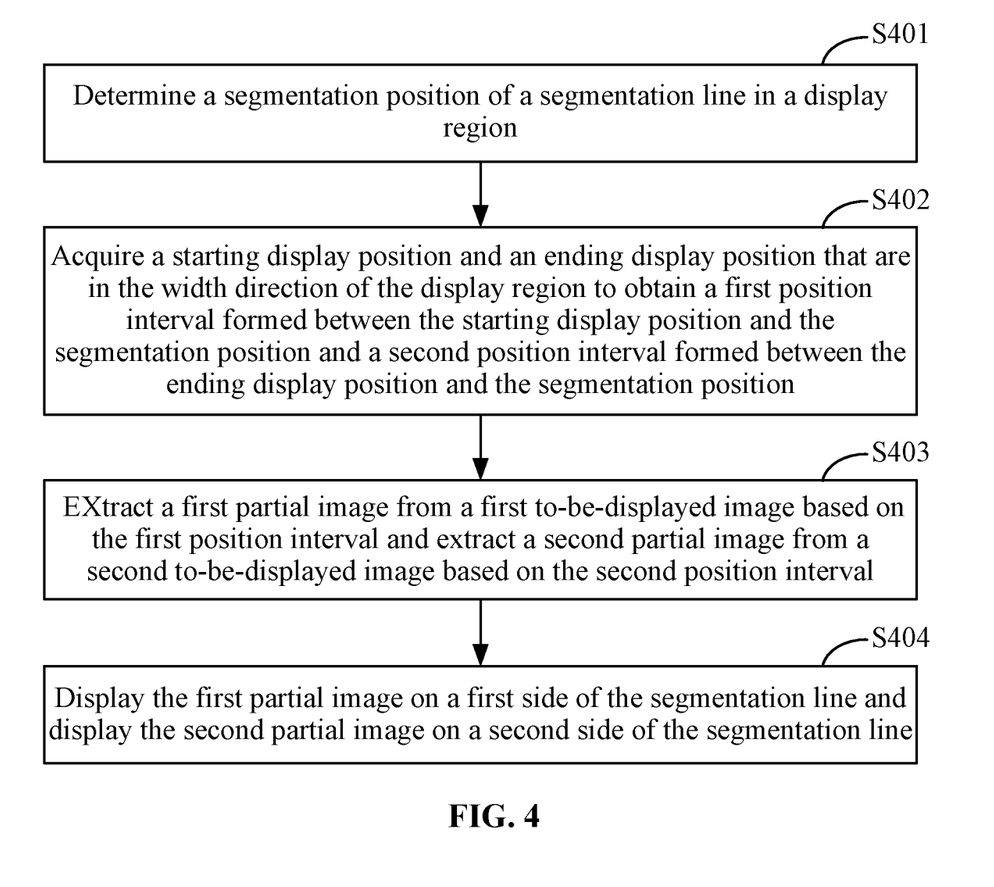
FIG. 4 is a diagram of another image processing method according to an embodiment of the present disclosure.

FIG. 4 is a diagram of another image processing method according to an embodiment of the present disclosure. This embodiment is a specific scheme to the preceding embodiment. In an embodiment, the step in which the first partial image extracted from the first to-be-displayed image is displayed on the first side of the segmentation line according to the segmentation position and the second partial image extracted from the second to-be-displayed image is displayed on the second side of the segmentation line according to the segmentation position includes that: a starting display position and an ending display position that are in the width direction of the display region are acquired to obtain a first position interval formed between the starting display position and the segmentation position and a second position interval formed between the ending display position and the segmentation position; the first partial image is extracted from the first to-be-displayed image based on the first position interval and the second partial image is extracted from the second to-be-displayed image based on the second position interval; and the first partial image is displayed on the first side of the segmentation line and the second partial image is displayed on the second side of the segmentation line. Referring to FIG. 4, the method includes the steps below.

In S401, a segmentation position of a segmentation line in a display region is determined.

In S402, a starting display position and an ending display position that are in the width direction of the display region are acquired to obtain a first position interval formed between the starting display position and the segmentation position and a second position interval formed between the ending display position and the segmentation position.

In S403, a first partial image is extracted from a first to-be-displayed image based on the first position interval and a second partial image is extracted from a second to-be-displayed image based on the second position interval.

In S404, the first partial image is displayed on a first side of the segmentation line, and the second partial image is displayed on a second side of the segmentation line.

The encoding manner of the first to-be-displayed image is different from the encoding manner of the second to-be-displayed image. The content of a synthesized image synthesized by the first partial image and the second partial image is the same as both the image content of the first to-be-displayed image and the image content of the second to-be-displayed image.

Figure 5:
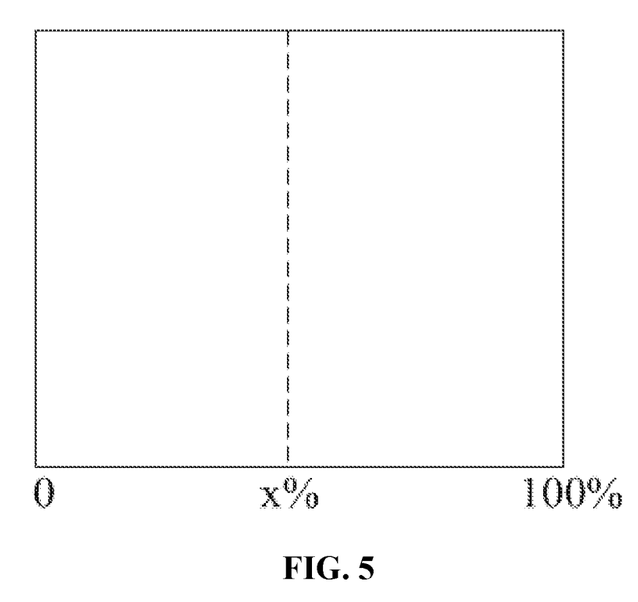
FIG. 5 is a diagram of a segmentation line according to an embodiment of the present disclosure.

The width direction is the direction where the width of the display region is located. The display region includes not only the width direction but also the height direction. The width direction is perpendicular to the height direction. In the case of horizontal screen viewing, a relatively long side of the electronic device may serve as the width direction. In the case of vertical screen viewing, a relatively short side of the electronic device may serve as the width direction. The starting display position is the starting position of the display region in the width direction. The ending display position is the ending position of the display region in the width direction. The first position interval may be an interval formed between the starting display position and the segmentation position and in the width direction. The second position interval may be an interval formed between the ending display position and the segmentation position and in the width direction. FIG. 5 is a diagram of a segmentation line according to an embodiment of the present disclosure. Referring to FIG. 5, in an example in which the segmentation position occupies x % of the width of the display region, [0, x %] denotes the first position interval, and [x %, 100%] denotes the second position interval.

In an embodiment, an image overlapping the first position interval is extracted from the first to-be-displayed image according to the first position interval to obtain the first partial image. Moreover, an image overlapping the second position interval is extracted from the second to-be-displayed image according to the second position interval to obtain the second partial image. Moreover, the first partial image is displayed on the first side of the segmentation line, and the second partial image is displayed on the second side of the segmentation line. The first position interval and the second position interval are determined through the position of the segmentation in the width direction of the display region, and the first partial image and the second partial image are extracted from the first to-be-displayed image and the second to-be-displayed image based on the first position interval and the second position interval respectively. In this case, the content of the synthesized image synthesized by the first partial image and the second partial image is the same as the image content of the first to-be-displayed image and the content of the synthesized image is the same as the image content of the second to-be-displayed image, helping to extract the partial images accurately and thereby improving the accuracy of image display.

In an embodiment, the image processing method further includes that: in response to a moving operation on the segmentation line, a segmentation position of a new segmentation line in the display region is determined, a first partial image re-extracted from the first to-be-displayed image is displayed on a first side of the new segmentation line according to the segmentation position of the new segmentation line, and a second partial image re-extracted from the second to-be-displayed image is displayed on a second side of the new segmentation line according to the segmentation position of the new segmentation line.

In embodiments of the present disclosure, the segmentation line is movable. Exemplarily, as for the moving operation on the segmentation line, the segmentation line may be moved by clicking the selected segmentation line with a mouse, the segmentation line may be moved through a scroll wheel of the mouse, or the segmentation line may be moved through keys on a keyboard, which is not limited in the present disclosure. The segmentation position of the new segmentation line is the segmentation position of the segmentation line after being moved. In an embodiment, when a user triggers the moving operation on the segmentation line, in response to the moving operation of the user, the segmentation position of the moved segmentation line, that is, the segmentation position of the new segmentation line, is acquired. According to the segmentation position of the new segmentation line, a new first position interval and a new second position interval are determined. A first partial image is re-extracted from the first to-be-displayed image according to the new first position interval. The re-extracted first partial image is displayed on the first side of the new segmentation line. A second partial image is re-extracted from the second to-be-displayed image according to the new second position interval. The re-extracted second partial image is displayed on the second side of the new segmentation line.

In response to the moving operation on the segmentation line, a first partial image is re-extracted from the first to-be-displayed image and a second partial image is re-extracted from the second to-be-displayed image, which enables the first partial image and the second partial image to be updated in real time according to the moving operation on the segmentation line, implementing a flexible comparison of the image quality between different regions in the image content and further improving the flexibility of the image quality comparison.

In the technical scheme of this embodiment, the first position interval and the second position interval are positioned accurately according to the starting display position and the ending display region that are in the width direction; a first partial image and a second partial image are extracted accurately through the first position interval and the second position interval, thereby improving the accuracy of image display; and the movement of the segmentation line helps improve the flexibility of the image quality comparison.

Figure 6:
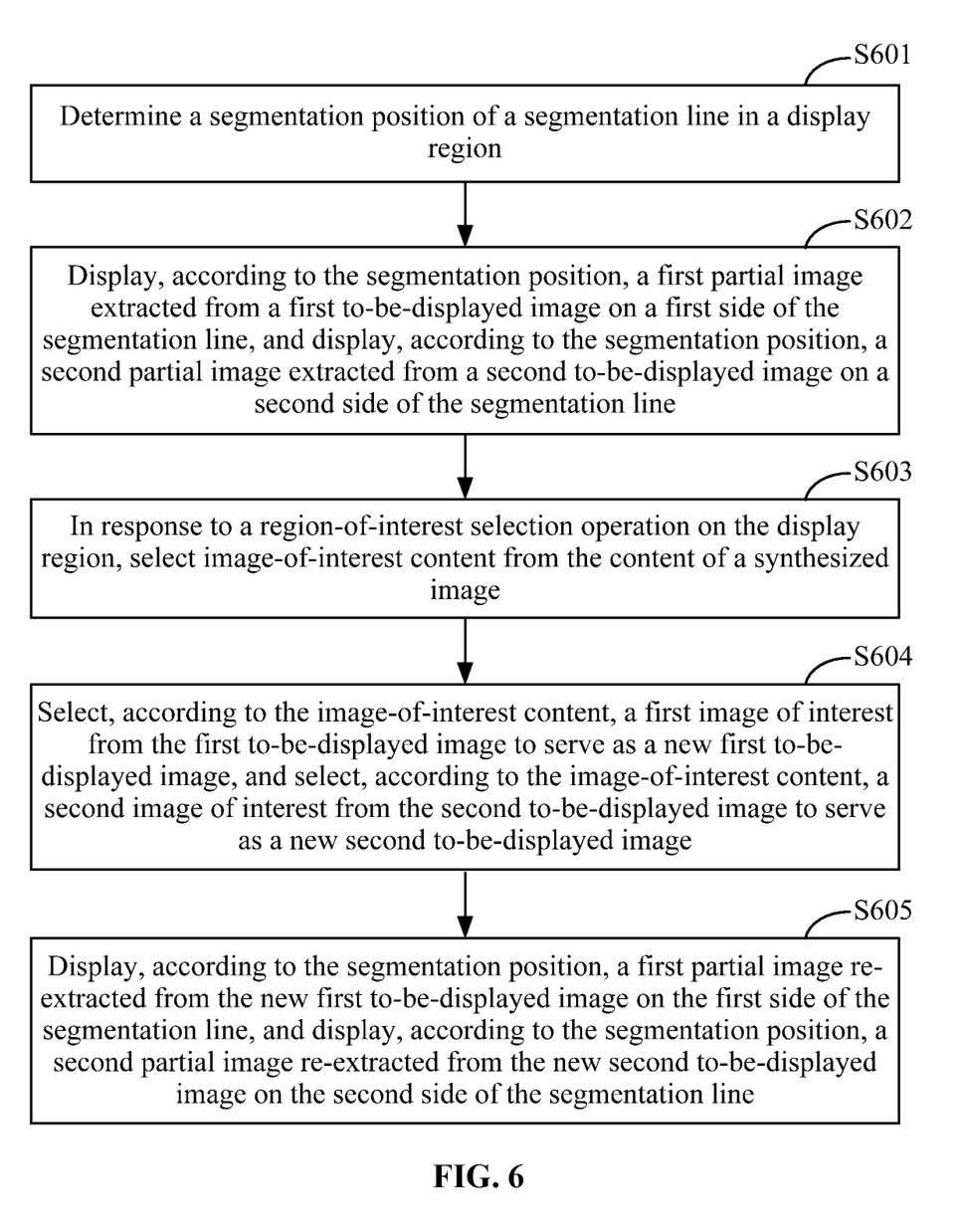
FIG. 6 is a diagram of another image processing method according to an embodiment of the present disclosure.

FIG. 6 is a diagram of another image processing method according to an embodiment of the present disclosure. This embodiment is a specific scheme to the preceding embodiments. In an embodiment, in response to a region-of-interest selection operation on the display region, image-of-interest content is selected from the content of the synthesized image; a first image of interest is selected from the first to-be-displayed image according to the image-of-interest content to serve as a new first to-be-displayed image; a second image of interest is selected from the second to-be-displayed image according to the image-of-interest content to serve as a new second to-be-displayed image; a first partial image re-extracted from the new first to-be-displayed image is displayed on the first side of the segmentation line according to the segmentation position; and a second partial image re-extracted from the new second to-be-displayed image is displayed on the second side of the segmentation line according to the segmentation position. Referring to FIG. 6, the method includes the steps below.

In S601, a segmentation position of a segmentation line in a display region is determined.

In S602, a first partial image extracted from a first to-be-displayed image is displayed on a first side of the segmentation line according to the segmentation position, and a second partial image extracted from a second to-be-displayed image is displayed on a second side of the segmentation line according to the segmentation position.

In S603, in response to a region-of-interest selection operation on the display region, image-of-interest content is selected from the content of a synthesized image.

In S604, a first image of interest is selected from the first to-be-displayed image according to the image-of-interest content to serve as a new first to-be-displayed image, and a second image of interest is selected from the second to-be-displayed image according to the image-of-interest content to serve as a new second to-be-displayed image.

In S605, a first partial image re-extracted from the new first to-be-displayed image is displayed on the first side of the segmentation line according to the segmentation position, and a second partial image re-extracted from the new second to-be-displayed image is displayed on the second side of the segmentation line according to the segmentation position.

The encoding manner of the first to-be-displayed image is different from the encoding manner of the second to-be-displayed image. The content of a synthesized image synthesized by the first partial image and the second partial image is the same as both the image content of the first to-be-displayed image and the image content of the second to-be-displayed image.

The selection operation is a selection operation performed by a user on a region of interest. Exemplarily, a partial region may be selected based on a rectangular box. The image-of-interest content is the content of part of an image of interest selected from the content of the synthesized image. In an embodiment, after the user performs the region-of-interest selection operation in the display region, a part the content of the synthesized image coinciding with the coordinates of the region of interest is selected from the content of the synthesized image according to the coordinates of the region of interest selected by the selection operation to serve as the image-of-interest content.

Moreover, according to the image-of-interest content, a new first to-be-displayed image is selected from the first to-be-displayed image, and a new second to-be-displayed image is selected from the second to-be-displayed image. It is to be noted that the region of interest is irrelevant to the position of the segmentation line. The region of interest may be located on one side of the segmentation line or may include two sides of the segmentation line. The new first to-be-displayed image and the new second to-be-displayed image are extracted no matter whether the region of interest is located on one side of the segmentation line. Moreover, the content of the new first to-be-displayed image and the content of the new second to-be-displayed image are the same and are both the image-of-interest content. Still, in the example in which the image content is four characters ABCD, the image-of-interest content may be two characters AB located on one side of the segmentation line.

The image-of-interest content is selected from the image content and in which the new first to-be-displayed image and the new second to-be-displayed image are selected from the first to-be-displayed image and the second to-be-displayed image according to the image-of-interest content respectively, which makes the data size of the new first to-be-displayed image smaller and the data size of the new second to-be-displayed image smaller. The first partial image re-extracted from the new first to-be-displayed image and the second partial image re-extracted from the new second to-be-displayed image are displayed in the display region, which implements an enlarged display of the first partial image and the second partial image and solves the problem that a large image resolution causes image information unable to be fully displayed in the display region and affects the subject determination of the user on image quality.

In an embodiment, after the first partial image re-extracted from the new first to-be-displayed image is displayed on the first side of the segmentation line and the second partial image re-extracted from the new second to-be-displayed image is displayed on the second side of the segmentation line, the method further includes that the information of a subjective quality comparison between the re-extracted first partial image and the re-extracted second partial image is acquired.

The information of the subjective quality comparison is the information that the user performs the subjective quality comparison between the re-extracted first partial image and the re-extracted second partial image, and the information of the subjective quality comparison is used for representing the information of a subjective evaluation of the user on the viewed image. Exemplarily, the information of the subjective quality comparison may be, for example, definition, integrity, and amount of information.

The new first to-be-displayed image and the new second to-be-displayed image are re-determined according to the region of interest and the first partial image and the second partial image are re-extracted according to the segmentation position, which makes the image content of the synthesized image displayed in the display region smaller. That is, the amount of information displayed by the image content can be enhanced through the enlarged display of the image-of-interest content, thereby helping the user perform the subjective quality comparison between the re-extracted first partial image and the re-extracted second partial image and further improving the convenience of the image quality comparison. The information of the subjective quality comparison may provide a basis for the selection of an encoding manner. For example, if it is determined through the comparison that the quality of the first to-be-displayed image is better, a first encoding manner used for the first to-be-displayed image may be selected for subsequent use.

In an embodiment, the evaluation on the re-extracted first partial image and the re-extracted second partial image may also include an objective evaluation value. Exemplarily, objective comparison information, including the peak signal-to-noise ratio of the first to-be-displayed image to the second to-be-displayed image and the structural similarity between the first to-be-displayed image and the second to-be-displayed image, may be output.

In the technical scheme of this embodiment, the image-of-interest content is selected from the image content according to the region-of-interest selection operation, which can enrich the amount of the displayed information in the region of interest and further improve the convenience of the image quality comparison.

Figure 7:
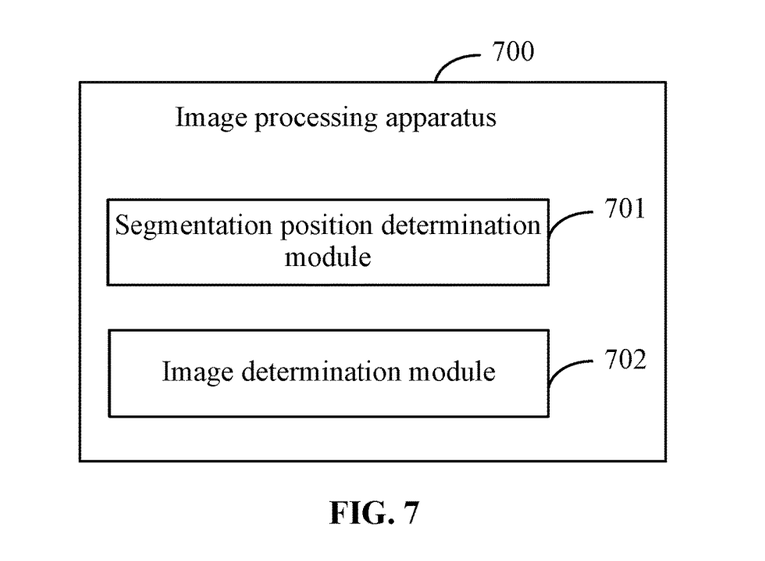
FIG. 7 is a diagram of an image processing apparatus according to an embodiment of the present disclosure.

FIG. 7 is a diagram of an image processing apparatus according to an embodiment of the present disclosure. Embodiments of the present disclosure are applicable to the case of processing image display so as to improve the convenience of subjectively determining an image and improve the accuracy of a subjective determination. The apparatus is implemented by software and/or hardware and is configured in an electronic device. The electronic device may be a computer.

An image processing apparatus 700 as shown in FIG. 7 includes a segmentation position determination module 701 and an image determination module 702.

The segmentation position determination module 701 is configured to determine a segmentation position of a segmentation line in a display region.

The image determination module 702 is configured to display, according to the segmentation position, a first partial image extracted from a first to-be-displayed image on a first side of the segmentation line, and display, according to the segmentation position, a second partial image extracted from a second to-be-displayed image on a second side of the segmentation line.

The encoding manner of the first to-be-displayed image is different from the encoding manner of the second to-be-displayed image. The content of a synthesized image synthesized by the first partial image and the second partial image is the same as both the image content of the first to-be-displayed image and the image content of the second to-be-displayed image.

In the technical scheme of this embodiment, the display region is segmented into two display sub-regions through the segmentation line, which facilitates operation. Additionally, the first partial image is displayed on the first side of the segmentation line, the second partial image is displayed on the second side of the segmentation line, and the two to-be-displayed images with the same image content but different encoding manners are displayed partially on two sides of the display region. In this case, the convenience and flexibility of the image quality comparison can be improved. Moreover, the content of the synthesized image is the same as the content of each of the two to-be-displayed images, maintaining the integrity of the content of the synthesized image in the display region, improving the convenience and flexibility of the image quality comparison, and thereby improving user experience.

In an embodiment, the image determination module 702 includes a position interval determination unit, an image extraction unit, and an image display unit.

The position interval determination unit is configured to acquire a starting display position and an ending display position that are in the width direction of the display region to obtain a first position interval formed between the starting display position and the segmentation position and a second position interval formed between the ending display position and the segmentation position.

The image extraction unit is configured to extract the first partial image from the first to-be-displayed image based on the first position interval and extract the second partial image from the second to-be-displayed image based on the second position interval.

The image display unit is configured to display the first partial image on the first side of the segmentation line and display the second partial image on the second side of the segmentation line.

In an embodiment, the image processing apparatus 700 further includes a new segmentation position determination module and a new image extraction module.

The new segmentation position determination module is configured to, in response to a moving operation on the segmentation line, determine a segmentation position of a new segmentation line in the display region.

The new image extraction module is configured to display, according to the segmentation position of the new segmentation line, a first partial image re-extracted from the first to-be-displayed image on a first side of the new segmentation line, and display, according to the segmentation position of the new segmentation line, a second partial image re-extracted from the second to-be-displayed image on a second side of the new segmentation line.

In an embodiment, the image processing apparatus 700 further includes a region-of-interest selection module, a to-be-displayed image determination module, and a partial image display module.

The region-of-interest selection module is configured to, in response to a region-of-interest selection operation on the display region, select image-of-interest content from the content of the synthesized image.

The to-be-displayed image determination module is configured to select, according to the image-of-interest content, a first image of interest from the first to-be-displayed image to serve as a new first to-be-displayed image, and select, according to the image-of-interest content, a second image of interest from the second to-be-displayed image to serve as a new second to-be-displayed image.

The partial image display module is configured to display, according to the segmentation position, a first partial image re-extracted from the new first to-be-displayed image on the first side of the segmentation line, and display, according to the segmentation position, a second partial image re-extracted from the new second to-be-displayed image on the second side of the segmentation line.

In an embodiment, the partial image display module is configured to acquire the information of a subjective quality comparison between the re-extracted first partial image and the re-extracted second partial image.

The preceding product may perform the method provided by any embodiment of the present disclosure and has functional modules and beneficial effects corresponding to the performed method.

In technical solutions of the present disclosure, the collection, storage, use, processing, transmission, provision, and disclosure of user personal information involved are in compliance with provisions of relevant laws and regulations and do not violate public order and good customs.

According to embodiments of the present disclosure, the present disclosure further provides an electronic device, a readable storage medium, and a computer program product.

Figure 8:
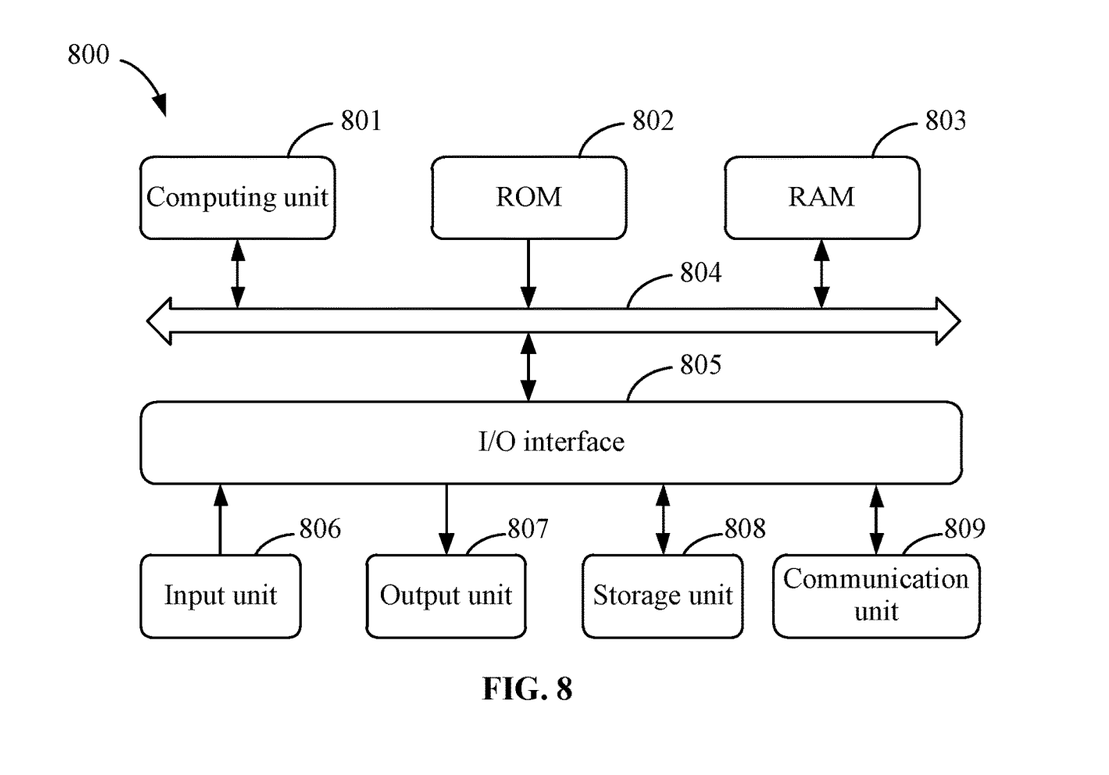
FIG. 8 is a block diagram of an electronic device for performing an image processing method according to an embodiment of the present disclosure.

FIG. 8 is a block diagram illustrating an exemplary electronic device 800 that may be configured to perform embodiments of the present disclosure. Electronic devices are intended to represent various forms of digital computers, for example, a laptop computer, a desktop computer, a worktable, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802, and the RAM 803 are connected to each other by a bus 804. An input/output (I/O) interface 805 is also connected to the bus 804.

Multiple components in the device 800 are connected to the I/O interface 805. The multiple components include an input unit 806 such as a keyboard and a mouse, an output unit 807 such as various types of displays and speakers, the storage unit 808 such as a magnetic disk and an optical disk, and a communication unit 809 such as a network card, a modem or a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 801 performs various methods and processing described above, such as the image processing method. For example, in some embodiments, the image processing method may be implemented as computer software programs tangibly contained in a machine-readable medium such as the storage unit 808. In some embodiments, part or all of computer programs may be loaded and/or installed on the device 800 via the ROM 802 and/or the communication unit 809. When the computer program is loaded to the RAM 803 and executed by the computing unit 801, one or more steps of the preceding image processing method may be performed. Alternatively, in other embodiments, the computing unit 801 may be configured, in any other suitable manner (for example, by means of firmware), to perform the image processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for the implementation of the method of the present disclosure may be written in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service. The server may also be a server of a distributed system, or a server combined with a blockchain.

Artificial intelligence is the study of making computers simulate certain human thinking processes and intelligent behaviors (such as learning, reasoning, thinking, and planning) both at the hardware and software levels. Artificial intelligence hardware technology generally includes, for example, sensors, special-purpose artificial intelligence chips, cloud computing, distributed storage, and big data processing. Artificial intelligence software technology mainly includes several major directions including computer vision technology, speech recognition technology, natural language processing technology, machine learning/deep learning technology, big data processing technology, and knowledge mapping technology.

Cloud computing refers to a technical system that accesses a shared elastic-and-scalable physical or virtual resource pool through a network, where resources may include servers, operating systems, networks, software, applications, and storage devices and may be deployed and managed in an on-demand, self-service manner by cloud computing. Cloud computing can provide efficient and powerful data processing capabilities for artificial intelligence, the blockchain, and other technical applications and model training.

It is to be understood that various forms of the preceding flows may be used with steps reordered, added, or removed. For example, the steps described in the present disclosure may be executed in parallel, in sequence, or in a different order as long as the desired result of the technical solutions provided in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. An image processing method, comprising:
    determining a segmentation position of a segmentation line in a display region; and
    displaying, according to the segmentation position, a first partial image extracted from a first to-be-displayed image on a first side of the segmentation line, and displaying, according to the segmentation position, a second partial image extracted from a second to-be-displayed image on a second side of the segmentation line;
    wherein an encoding manner of the first to-be-displayed image is different from an encoding manner of the second to-be-displayed image; and content of a synthesized image synthesized by the first partial image and the second partial image is the same as image content of the first to-be-displayed image and the content of the synthesized image is the same as image content of the second to-be-displayed image;
    after displaying the first partial image extracted from the first to-be-displayed image on the first side of the segmentation line, and displaying the second partial image extracted from the second to-be-displayed image on the second side of the segmentation line, the method further comprising:
    in response to a region-of-interest selection operation on the display region, selecting image-of-interest content from the content of the synthesized image;
    selecting, according to the image-of-interest content, a first image of interest from the first to-be-displayed image to serve as a new first to-be-displayed image, and selecting, according to the image-of-interest content, a second image of interest from the second to-be-displayed image to serve as a new second to-be-displayed image; and
    displaying, according to the segmentation position, a first partial image re-extracted from the new first to-be-displayed image on the first side of the segmentation line, and displaying, according to the segmentation position, a second partial image re-extracted from the new second to-be-displayed image on the second side of the segmentation line.

2. The method according to claim 1, wherein displaying, according to the segmentation position, the first partial image extracted from the first to-be-displayed image on the first side of the segmentation line, and displaying, according to the segmentation position, the second partial image extracted from the second to-be-displayed image on the second side of the segmentation line comprises:
    acquiring a starting display position and an ending display position that are in a width direction of the display region to obtain a first position interval formed between the starting display position and the segmentation position and a second position interval formed between the ending display position and the segmentation position;
    extracting the first partial image from the first to-be-displayed image based on the first position interval, and extracting the second partial image from the second to-be-displayed image based on the second position interval; and displaying the first partial image on the first side of the segmentation line, and displaying the second partial image on the second side of the segmentation line.

3. The method according to claim 1, further comprising:

in response to a moving operation on the segmentation line, determining a segmentation position of a new segmentation line in the display region; and displaying, according to the segmentation position of the new segmentation line, a first partial image re-extracted from the first to-be-displayed image on a first side of the new segmentation line, and displaying, according to the segmentation position of the new segmentation line, a second partial image re-extracted from the second to-be-displayed image on a second side of the new segmentation line.

4. The method according to claim 1, after displaying the first partial image re-extracted from the new first to-be-displayed image on the first side of the segmentation line, and displaying the second partial image re-extracted from the new second to-be-displayed image on the second side of the segmentation line, further comprising:

acquiring information of a subjective quality comparison between the re-extracted first partial image and the re-extracted second partial image.

5. An electronic device, comprising:

at least one processor; and a memory communicatively connected to the at least one processor, wherein the memory stores an instruction executable by the at least one processor, and the instruction is executed by the at least one processor to cause the at least one processor to perform:

determining a segmentation position of a segmentation line in a display region; and displaying, according to the segmentation position, a first partial image extracted from a first to-be-displayed image on a first side of the segmentation line, and displaying, according to the segmentation position, a second partial image extracted from a second to-be-displayed image on a second side of the segmentation line;

wherein an encoding manner of the first to-be-displayed image is different from an encoding manner of the second to-be-displayed image; and content of a synthesized image synthesized by the first partial image and the second partial image is the same as image content of the first to-be-displayed image and the content of the synthesized image is the same as image content of the second to-be-displayed image;

wherein the instruction is executed by the at least one processor to cause the at least one processor to, after displaying the first partial image extracted from the first to-be-displayed image on the first side of the segmentation line, and displaying the second partial image extracted from the second to-be-displayed image on the second side of the segmentation line, further perform:

in response to a region-of-interest selection operation on the display region, selecting image-of-interest content from the content of the synthesized image;

selecting, according to the image-of-interest content, a first image of interest from the first to-be-displayed image to serve as a new first to-be-displayed image, and selecting, according to the image-of-interest content, a second image of interest from the second to-be-displayed image to serve as a new second to-be-displayed image; and displaying, according to the segmentation position, a first partial image re-extracted from the new first to-be-displayed image on the first side of the segmentation line, and displaying, according to the segmentation position, a second partial image re-extracted from the new second to-be-displayed image on the second side of the segmentation line.

6. The electronic device of claim 5, wherein the instruction is executed by the at least one processor to cause the at least one processor to perform displaying, according to the segmentation position, the first partial image extracted from the first to-be-displayed image on the first side of the segmentation line, and displaying, according to the segmentation position, the second partial image extracted from the second to-be-displayed image on the second side of the segmentation line in the following way:

acquiring a starting display position and an ending display position that are in a width direction of the display region to obtain a first position interval formed between the starting display position and the segmentation position and a second position interval formed between the ending display position and the segmentation position;

extracting the first partial image from the first to-be-displayed image based on the first position interval, and extracting the second partial image from the second to-be-displayed image based on the second position interval; and displaying the first partial image on the first side of the segmentation line, and displaying the second partial image on the second side of the segmentation line.

7. The electronic device of claim 5, wherein the instruction is executed by the at least one processor to cause the at least one processor to further perform:

in response to a moving operation on the segmentation line, determining a segmentation position of a new segmentation line in the display region; and displaying, according to the segmentation position of the new segmentation line, a first partial image re-extracted from the first to-be-displayed image on a first side of the new segmentation line, and displaying, according to the segmentation position of the new segmentation line, a second partial image re-extracted from the second to-be-displayed image on a second side of the new segmentation line.

8. The electronic device of claim 6, wherein the instruction is executed by the at least one processor to cause the at least one processor to, after displaying the first partial image re-extracted from the new first to-be-displayed image on the first side of the segmentation line, and displaying the second partial image re-extracted from the new second to-be-displayed image on the second side of the segmentation line, further perform:

acquiring information of a subjective quality comparison between the re-extracted first partial image and the re-extracted second partial image.

9. A non-transitory computer-readable storage medium storing a computer instruction, wherein the computer instruction is configured to cause a computer to perform:

determining a segmentation position of a segmentation line in a display region; and displaying, according to the segmentation position, a first partial image extracted from a first to-be-displayed image on a first side of the segmentation line, and displaying, according to the segmentation position, a second partial image extracted from a second to-be-displayed image on a second side of the segmentation line;

wherein an encoding manner of the first to-be-displayed image is different from an encoding manner of the second to-be-displayed image; and content of a synthesized image synthesized by the first partial image and the second partial image is the same as image content of the first to-be-displayed image and the content of the synthesized image is the same as image content of the second to-be-displayed image;

wherein the computer instruction is configured to cause the computer to, after displaying the first partial image extracted from the first to-be-displayed image on the first side of the segmentation line, and displaying the second partial image extracted from the second to-be-displayed image on the second side of the segmentation line, further perform:

in response to a region-of-interest selection operation on the display region, selecting image-of-interest content from the content of the synthesized image;

selecting, according to the image-of-interest content, a first image of interest from the first to-be-displayed image to serve as a new first to-be-displayed image, and selecting, according to the image-of-interest content, a second image of interest from the second to-be-displayed image to serve as a new second to-be-displayed image; and displaying, according to the segmentation position, a first partial image re-extracted from the new first to-be-displayed image on the first side of the segmentation line, and displaying, according to the segmentation position, a second partial image re-extracted from the new second to-be-displayed image on the second side of the segmentation line.

10. The non-transitory computer-readable storage medium of claim 9, wherein the computer instruction is configured to cause the computer to perform displaying, according to the segmentation position, the first partial image extracted from the first to-be-displayed image on the first side of the segmentation line, and displaying, according to the segmentation position, the second partial image extracted from the second to-be-displayed image on the second side of the segmentation in the following way:

acquiring a starting display position and an ending display position that are in a width direction of the display region to obtain a first position interval formed between the starting display position and the segmentation position and a second position interval formed between the ending display position and the segmentation position;

extracting the first partial image from the first to-be-displayed image based on the first position interval, and extracting the second partial image from the second to-be-displayed image based on the second position interval; and displaying the first partial image on the first side of the segmentation line, and displaying the second partial image on the second side of the segmentation line.

11. The non-transitory computer-readable storage medium of claim 9, wherein the computer instruction is configured to cause the computer to further perform:

in response to a moving operation on the segmentation line, determining a segmentation position of a new segmentation line in the display region; and displaying, according to the segmentation position of the new segmentation line, a first partial image re-extracted from the first to-be-displayed image on a first side of the new segmentation line, and displaying, according to the segmentation position of the new segmentation line, a second partial image re-extracted from the second to-be-displayed image on a second side of the new segmentation line.

12. The non-transitory computer-readable storage medium of claim 9, wherein the computer instruction is configured to cause the computer to, after displaying the first partial image re-extracted from the new first to-be-displayed image on the first side of the segmentation line, and displaying the second partial image re-extracted from the new second to-be-displayed image on the second side of the segmentation line, further perform:

acquiring information of a subjective quality comparison between the re-extracted first partial image and the re-extracted second partial image.

\* \* \* \* \*